United States Patent
Ohno

(10) Patent No.: US 8,027,546 B2
(45) Date of Patent: Sep. 27, 2011

(54) METHOD, APPARATUS, AND COMPUTER PROGRAM FOR IMAGE DATA PROCESSING

(75) Inventor: Satoru Ohno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1071 days.

(21) Appl. No.: 11/892,232

(22) Filed: Aug. 21, 2007

(65) Prior Publication Data

US 2008/0052484 A1    Feb. 28, 2008

(30) Foreign Application Priority Data

Aug. 22, 2006  (JP) .................. 2006-225569
Jun. 15, 2007  (JP) .................. 2007-159072

(51) Int. Cl.
*G06K 9/36* (2006.01)

(52) U.S. Cl. ........................ 382/239; 382/232

(58) Field of Classification Search ........... 382/232–253
See application file for complete search history.

(56) References Cited

U.S. PATENT DOCUMENTS

| | | | | |
|---|---|---|---|---|
| 5,867,602 A | * | 2/1999 | Zandi et al. | 382/248 |
| 6,000,009 A | * | 12/1999 | Brady | 711/112 |
| 6,259,826 B1 | * | 7/2001 | Pollard et al. | 382/284 |
| 6,795,208 B1 | * | 9/2004 | Tanaka | 358/1.16 |
| 7,190,284 B1 | * | 3/2007 | Dye et al. | 341/51 |
| 7,215,820 B2 | * | 5/2007 | Zandi et al. | 382/240 |
| 7,292,729 B2 | * | 11/2007 | Ageyev et al. | 382/232 |
| 7,421,136 B2 | * | 9/2008 | Sirohey et al. | 382/240 |
| 2010/0202708 A1 | * | 8/2010 | Fukaya | 382/246 |

FOREIGN PATENT DOCUMENTS

JP    2005-167841    6/2005

* cited by examiner

*Primary Examiner* — Bhavesh Mehta
*Assistant Examiner* — Sean Motsinger
(74) *Attorney, Agent, or Firm* — Dickstein Shapiro LLP

(57) ABSTRACT

An image processing apparatus includes an input device, an encoder, a memory, a first allocator, a data block size determination mechanism, a second allocator, and a processor. The input device receives image data of a given data size and transmits the image data in N data blocks. The "N" represents a first given number. The encoder encodes the N data blocks transmitted from the input unit. The memory stores the N data blocks encoded by the encoder. The first allocator allocates, before encoding, N memory areas of a specified memory size within the memory. The determination mechanism determines whether each of the N data blocks is larger than the memory size. The second allocator dynamically allocates an additional memory area within the memory when the determination mechanism determines that one of the N data blocks is larger than the memory size. The processor retrieves the image data for processing thereof.

19 Claims, 8 Drawing Sheets

METHOD, APPARATUS, AND COMPUTER PROGRAM FOR IMAGE DATA PROCESSING

This patent specification claims priority from Japanese Patent Application Nos. 2006-225569, filed on Aug. 22, 2006, and 2007-159072, filed on Jun. 15, 2007 in the Japanese Patent Office, the entire contents of each of which are incorporated by reference herein.

BACKGROUND OF THE INVENTION

1. Field of the Invention

The present invention relates to a method, apparatus, and computer program for image data processing, and more particularly, to a method, apparatus, and computer program for image data processing enabling a reduction of memory consumption through efficient storage of compressed image data.

2. Discussion of the Background

Converting analog information into digital data is a typical method used to facilitate the handling of information in computer processing, transmission through optical fibers, and recording on or reading from a storage medium such as a memory disk. Information in the form of digital data is expressed using a discrete series of binary digits.

In information processing, data and signals can be transformed from one format into another through specific schemes so that the transformed information may be converted back into the original format or into a similar signal or data format. Such a process is called encoding.

There are different types of encoding schemes, such as encryption and compression, used to convert digital data into a form suitable for efficient manipulation. For example, in data compression, original data is converted into another form smaller in size without noticeable loss of information. Using data compression is effective in reducing consumption of resources, such as bandwidth and traffic for data transmission or memory space for data storage.

Various types of data compression techniques and formats have been designed and used for specific purposes, such as JPEG and Graphics Interchange Format (GIF) for image data, MPEG-1, MPEG-2, MPEG-4, MPEG-7, and MPEG-21, compression standards for audio-visual data using inter-frame prediction and DCT techniques, or MPEG-1 Audio Layer I (MP1), MPEG-1 Audio Layer II (MP2), and MPEG-1 Audio Layer III (MP3) for digitized audio data. In addition, as common compression utilities, ZIP and LHA are widely used on computer systems.

Using compression methods in data processing provides a reduction in data size, which is represented by a data compression ratio defined as a ratio between an original uncompressed size and a compressed size of data. The data compression ratio varies depending on the type of data file and the type of compression technique used to create a data file.

For example, pulse-code modulation (PCM) audio data can be compressed, with an acceptable level of quality, to compression ratios of approximately 11 by MP3, approximately 7 by MP2, and approximately 4 by MP1, respectively. By using ZIP and LHA methods, a text file can be compressed at a compression ratio of approximately 3 (to approximately 35% of the uncompressed size), a bitmap image file at a compression ratio of approximately 1.4 (to approximately 70% of the uncompressed size), and an executable file at a compression ratio of approximately 2 (to approximately 50% of the uncompressed size).

Among the aforementioned compression techniques, image data compression techniques have been applied to image processing methods for saving memory space. For example, GIF is a type of bit-mapped, general purpose graphics file format used on the World Wide Web (WWW). GIF encoding is suitable for processing images with a small number of colors, such as illustrations and button graphics, due to a high compression ratio in coding image data having large uniformly colored areas. In addition, JPEG is also effective in reducing memory consumption for storing and transmitting image data. In JPEG encoding, image data is split into 8×8 blocks, each of which is converted into frequency space using a two-dimensional forward discrete cosine transform (DCT). The result is quantized to reduce the amount of information, and then is compressed by an entropy coding. The entropy coding is a data compression scheme that assigns codes for symbols so as to match code lengths with the probabilities of the symbols.

In a common image processing method, image data acquired using an input device such as a scanner is encoded by a known compression technique to be stored in a memory space. In such encoding/storage process, the image data is transferred between the input device and the memory space using direct memory access (DMA), which does not involve calculation by a central processing unit (CPU), enabling the CPU to execute other tasks during data transmission. As the DMA transfer once set cannot be interrupted, an appropriate amount of memory for storing image data in an encoded form needs to be allocated prior to the DMA transfer.

In memory allocation, it is important to prevent errors caused by running out of memory. When additional memory space cannot be reserved during data transfer, allocating an insufficient amount of memory, e.g., several percents of the uncompressed size, may lead to out-of-memory conditions. As the compression ratio varies depending on the type of image data, a conventional image processing apparatus allocates a memory space that can store image data in an uncompressed form, ensuring the entire image data can be properly stored. However, this method causes a significant amount of wasted memory when stored image data is compressed at a high compression ratio.

To obviate such inefficiency, another conventional image processing apparatus has been designed, which allocates memory space of a given size while adjusting the compression ratio for encoding image data so as to store the entire image data within the allocated memory space. The apparatus compares an actual code size with a given reference at a given timing during a scanning operation. When the actual code size is larger than the given reference, the apparatus adjusts the compression ratio to make the code size equal to or smaller than the given reference. By doing so, the apparatus reduces an amount of wasted memory while eliminating the need for re-executing the scanning operation.

Such a method may provide increased efficiency in storing image data, but also has a drawback in terms of processing speed as scanning is suspended or decelerated for executing the adjustment of compression ratio. Thus, there exists a continuing need to develop an image processing apparatus achieving a reduction in memory consumption without sacrificing processing speed.

SUMMARY OF THE INVENTION

This patent specification describes a novel image processing apparatus enabling a reduction of memory consumption through efficient storage of compressed image data.

In one embodiment, the novel image processing apparatus includes an input device, an encoder, a memory, a first allocator, a data block size determination mechanism, a second allocator, and a processor. The input device is configured to receive image data of a given data size and transmit the image data in N data blocks. The "N" represents a first given number. The encoder is configured to encode the N data blocks transmitted from the input unit. The memory is configured to store the N data blocks encoded by the encoder. The first allocator is configured to allocate, before encoding, N memory areas of a specified memory size within the memory. The determination mechanism is configured to determine whether each of the N data blocks is larger than the memory size. The second allocator is configured to dynamically allocate an additional memory area within the memory when the determination mechanism determines that one of the N data blocks is larger than the memory size. The processor is configured to retrieve the image data from the memory for processing thereof.

This patent specification further describes a novel image processing method enabling a reduction of memory consumption through efficient storage of compressed image data.

In one embodiment, the novel image processing method includes the steps of inputting, encoding, allocation, storage, determination, dynamic allocation, and processing. The inputting step inputs image data of a given data size transmitted in N data blocks. The "N" represents a first given number. The encoding step encodes the N data blocks. The allocating step allocates, before the encoding step, N memory areas within a memory. The storing step stores the encoded N data blocks in the memory. The determining step determines whether each of the N data blocks is larger than a specified memory size. The dynamically allocating step dynamically allocates an additional memory area within the memory when determining that one of the N data blocks is larger than the memory size. The processing step retrieves the image data from the memory for processing thereof.

This patent specification further describes a novel computer program enabling a reduction of memory consumption through efficient storage of compressed image data.

In one embodiment, the novel computer program causes a computer to perform the novel image processing method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
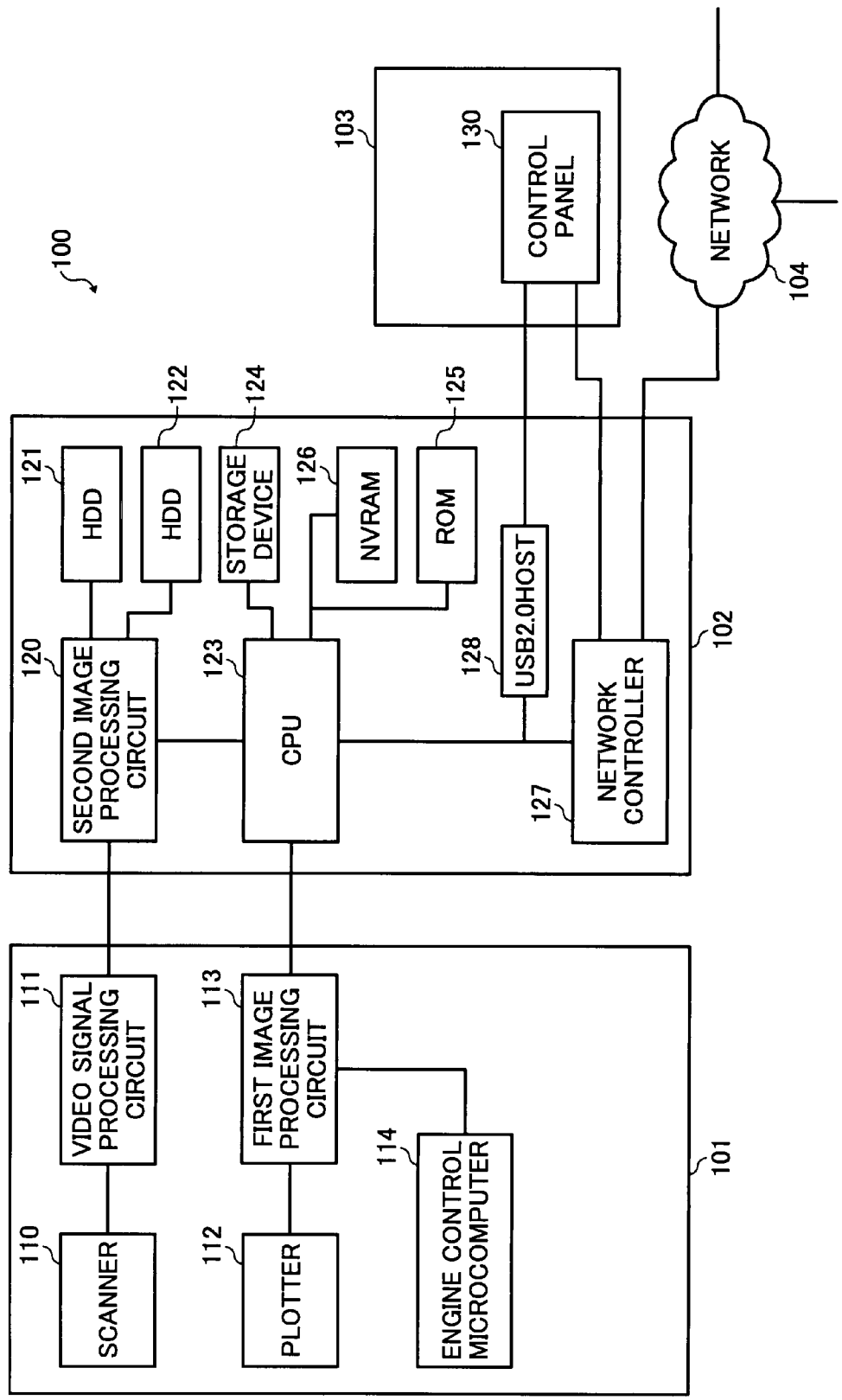
FIG. 1 is a schematic illustration of an image processing apparatus according to at least one example embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1 of the drawings, an image processing apparatus 100 according to at least one example embodiment of the present invention is described.

The image processing apparatus 100 includes an input/output unit 101, a control unit 102, and an operation unit 103. The control unit 102 is connected to other computers and/or devices, not shown, via a network 104.

The input/output unit 101 includes a scanner 110, a video signal processing circuit 111, a plotter 112, a first image processing circuit 113, and an engine control microcomputer 114.

The control unit 102 includes a second image processing circuit 120, hard disk drives (HDDs) 121 and 122, a central processing unit (CPU) 123, a storage device 124, a read-only memory (ROM) 125, a non-volatile random access memory (NVRAM) 126, a network controller 127, and a universal serial bus (USB) 2.0 host 128.

The operation unit 103 includes a control panel 130.

In the input/output unit 101, the scanner 110 serving as an input device analyzes an image to obtain image data. The video signal processing circuit 111 is connected to the scanner 110, performs correction on the obtained image data, and outputs the corrected image data to the control unit 102.

The first image processing circuit 113 is connected to the control unit 102, receives image data output therefrom, and performs processing on the output image data. The plotter 112 receives the image data from the first image processing circuit 113, and executes printing on a recording sheet. The engine control microcomputer 114 controls operation of the first image processing circuit 113.

In the control unit 102, the second image processing circuit 120 is connected to the video signal processing circuit 111, receives image data therefrom, and performs processing on the image data. The HDDs 121 and 122 are connected to the second image processing circuit 120, and store data and control programs related to the image processing.

The CPU 123 is connected to the first and second image processing circuits 113 and 120, the storage device 124, the ROM 125, the NVRAM 126, the network controller 127, and the USB 2.0 host 128, respectively, and controls overall operation of the image processing apparatus 100. The storage device 124 is rewritable storage for data handled by the CPU 123. The ROM 125 is read-only storage for programs and data used by the CPU 123. The NVRAM 126 is used to preserve data contents during power-off.

The network controller 127 is connected to the network 104, and controls data transmission to and from the network 104. The USB 2.0 host 128 is connected to the operation unit 103 via USB, and serves as an interface between the control unit 102 and the operation unit 103.

In the operation unit 103, the control panel 130 serves as a user interface enabling a user to input information. The user-input information is transmitted to the CPU 123 via the USB 2.0 host 128 to be processed by the CPU 123. The control panel 130 may be an operation panel equipment (OPE) having a liquid crystal display (LCD) touch panel.

In the image processing apparatus 100, a high speed bus which can support high speed transfer of a large amount of data may be used to make connections between the video signal processing circuit 111 and the second image processing circuit 120, between the first image processing circuit 113 and the CPU 123, and between the second image processing circuit 120 and the CPU 123, respectively.

In processing of image data, first, raw data is input in the image processing apparatus 100 by an input means for obtaining image data. The obtained image data is converted into a digitized form, then compressed to be stored for further processing. Such compression and storage process is applied to any kind of image processing, such as image scanning, that can be performed by the image processing apparatus 100.

With reference to FIG. 1, in image scanning, raw data read by the scanner 110 is transferred via the video signal processing circuit 111 to the second image processing circuit 120, therein encoded and compressed and then directly stored in the storage device 124 without involving calculation by the CPU 123, allowing other tasks to be simultaneously executed by the CPU 123.

The data transfer from the scanner 110 to the storage device 124 is performed using direct memory access (DMA). As the DMA transfer once set cannot be interrupted before the entire amount of data acquired in a single scan is completely moved to the storage device 124, the scanning operation for a single-page image is performed without interruption. Therefore, memory space for storing data of the scanned image is allocated before scanning.

Additionally, in the image processing apparatus 100, settings related to compression and storage of image data are stored in the HDDs 121 and 122 so as to be read and/or modified when necessary. Such settings include original data size, reference compression ratio, and division number.

The original data size represents a data size of an original image. The original data size is determined according to conditions specified by a user, such as paper size and image resolution. For example, when a paper size is selected, such as A4, A3, B5, etc., a maximum possible value for the selected paper size is calculated to be the original data size.

The reference compression ratio represents a compression ratio at which the amount of data acquired from the original image is assumed to be compressed. The reference compression ratio is determined as, for example, a compression ratio at which most business documents are properly compressed. The reference compression ratio may be appropriately set according to applications and environments, for example, different values are set for an environment where graphic documents are frequently handled and an environment where text documents are more likely to be handled.

The division number represents a number by which to divide the original image into sections termed "bands" in encoding image data. Setting a higher value of division number results in a reduction in memory consumption, but also causes a high CPU load during image data encoding. Considering this trade-off, the division number is appropriately determined and adjusted, manually and/or automatically, according to properties of the image processing apparatus 100, such as memory size, memory boundary, and CPU performance.

Figure 2:
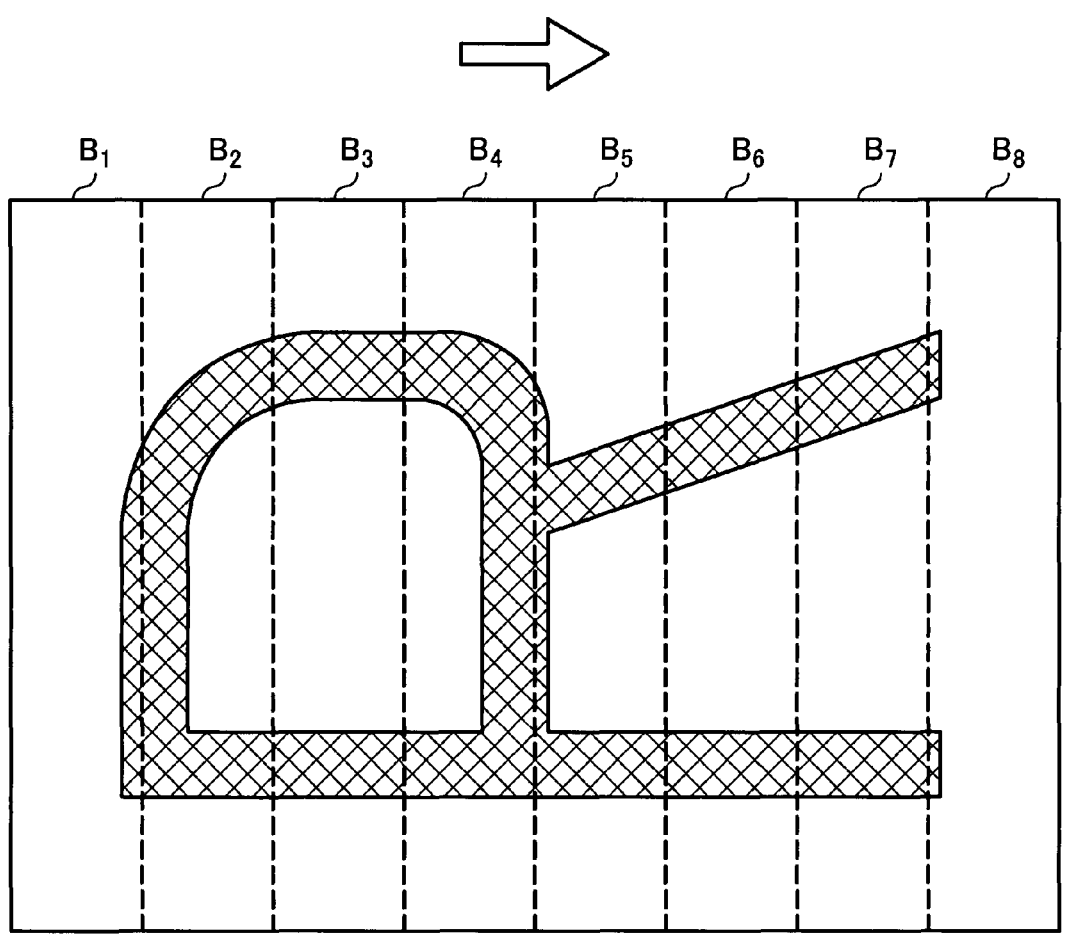
FIG. 2 is an illustration showing an example of a single-page paper document to be processed by the image processing apparatus of FIG. 1.

Referring to FIG. 2, an example of a single-page paper document 1 to be processed by the image processing apparatus 100 is described.

Figure 3:
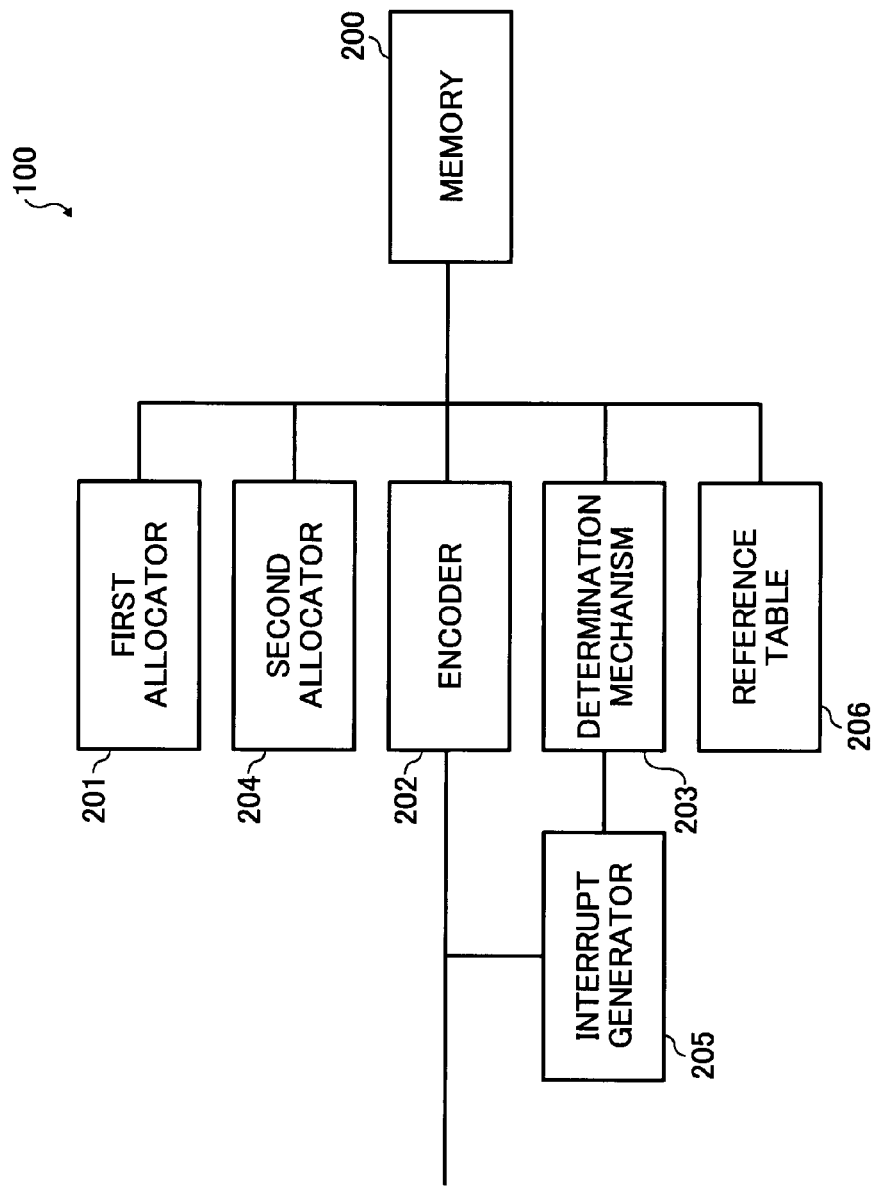
FIG. 3 is a block diagram illustrating components related to data compression and storage in the image processing apparatus of FIG. 1.

The paper document 1 is a sheet of A3 size (297 mm×420 mm) with an image of "R" on a surface thereof. In FIG. 3, the surface of the paper document 1 is scanned in a direction designated by an arrow (hereinafter referred to as "scan direction"). As indicated by dotted lines in FIG. 2, the paper document 1 is divided into eight bands $B_1$ through $B_8$ along the scan direction, i.e., the division number is set to eight.

In a scanning operation, the scanner 110 scans the paper document 1 at a linear scan speed of, for example, 210 mm/s in the scan direction. As the length of the paper document 1 is 420 mm, the scan is performed in 2 seconds. Image data obtained from the paper document 1 is transferred to the video signal processing circuit 111, subjected to correction, and transferred to the second image processing circuit 120 to be stored in the storage device 124.

Referring now to FIG. 3, a block diagram illustrating components related to data compression and storage in the image processing apparatus 100 is described.

The image processing apparatus 100 includes a memory 200, a first allocator 201, an encoder 202, a determination mechanism 203, a second allocator 204, an interrupt generator 205, and a reference table 206.

The components above represent functions performed by the architecture as depicted in FIG. 1. For example, the first allocator 201, the encoder 202, the determination mechanism 203, and the second allocator 204 may represent functions of the second image processing circuit 120 achieved through execution of a computer program stored in the HDDs 121 and 122. Likewise, the interrupt generator 205 may represent a function of the video signal processing circuit 111. The memory 200 is involved in the storage device 124. The reference table 206 is involved in, for example, one of the HDDs 121 and 122.

As shown in FIG. 3, in compression and storage of image data obtained from the paper document 1, the first allocator 201 assigns memory space for the input image data. Then, the image data is divided into data blocks by the interrupt generator 205 to be encoded by the encoder 202. The encoded data blocks are stored in the memory 200.

In allocating memory space, first, the first allocator 201 calculates a reference compressed size based on the original data size, the reference compression ratio, and the division number. The reference compressed size represents an assumed data size for one band of the original image in a form compressed by the reference compression ratio. In addition, the first allocator 201 may also calculate an uncompressed size. The uncompressed size represents a data size for one band of the original image in an uncompressed form.

Then, the first allocator 201 reserves a memory space in the memory 200 based on the reference compressed size and the uncompressed size. The memory space allocated in the memory 200 includes a sequence of memory areas, each of which is set to have the reference compressed size (hereinafter referred to as "compression area") or the uncompressed size (hereinafter referred to as "non-compression area"). The number of memory areas is set equal to the division number, i.e., the number of data blocks to be stored in the memory space.

In dividing the image data, the interrupt generator 205 generates an interrupt whenever the scanning is completed for each of the bands $B_1$ through $B_7$, respectively, that is, seven interrupts in total, and a termination interrupt when the scanning of the last band $B_8$ is completed. Consequently, an interrupt occurs every 250 milliseconds for a total of eight times. Timing of interrupts may be measured using an internal clock, for example.

The image data of the paper document 1 is thereby divided into eight data blocks corresponding to the bands $B_1$ through $B_8$. The data blocks are generated in an order corresponding to the scan direction to be sequentially transferred to the encoder 202.

In encoding the image data, the data blocks are sequentially encoded by the encoder 202 using a compression method such as JPEG. The encoded data blocks are output one after another from the encoder 202 to be sequentially stored in the memory 200.

In storing the image data, the encoded data blocks are disposed in a memory space including eight memory areas, allocated by the first allocator 201 prior to scanning. The data blocks are successively transferred to the memory space and respectively disposed in a corresponding one of the memory areas. As a result, when the data blocks are compressed by a compression ratio equal to or larger than the reference compression ratio, each data block is stored within one memory area.

However, as a single page of an original document can contain graphics and text portions which are processed using different compression ratios, it is possible that one of the data blocks is compressed by an actual compression ratio smaller than the reference compression ratio, e.g., the actual compression ratio is 3 while the reference compression ratio is 5. In such cases, the data block compressed by the smaller compression ratio overflows one memory area allocated thereto, which may lead to an error due to insufficient memory.

To avoid such an error, the image processing apparatus 100 detects overflow in the memory 200 during a scanning operation and dynamically allocates additional memory space in response to the detection of memory overflow. The dynamic allocation of additional memory space is performed without interrupting the scanning operation.

In detecting overflow in the memory 200, the determination mechanism 203 determines whether or not each encoded data block is stored within one memory area by reference to the reference table 206. Specifically, the determination mechanism 203 determines whether or not an assumed number of data blocks stored in the memory 200 (hereinafter referred to as "data block count") is identical to the number of memory areas actually used to store the data blocks (hereinafter referred to as "memory area count").

In the reference table 206, the data block count is incremented as the encoder 202 outputs one encoded data block, and at the same time, the memory area count is incremented by a number of memory areas used to store the encoded data block. The data block count may, for example, be defined as the number of descriptors used to output the encoded data blocks, recorded by a register contained in the CPU 123. The memory area count may be calculated based on the size of each encoded data block and the reference compressed size.

The determination mechanism 203 may read the reference table 206 whenever the interrupt generator 205 generates an interrupt, or after a given number of encoded data blocks, e.g., five data blocks among nine, are stored in the memory 200.

When the determination mechanism 203 determines that the data block count is not identical to the memory area count, it is assumed that additional memory space is needed. The second allocator 204 calculates a difference between the data block count and the memory area count to dynamically allocate additional memory areas in accordance with the calculated difference.

Figure 4:
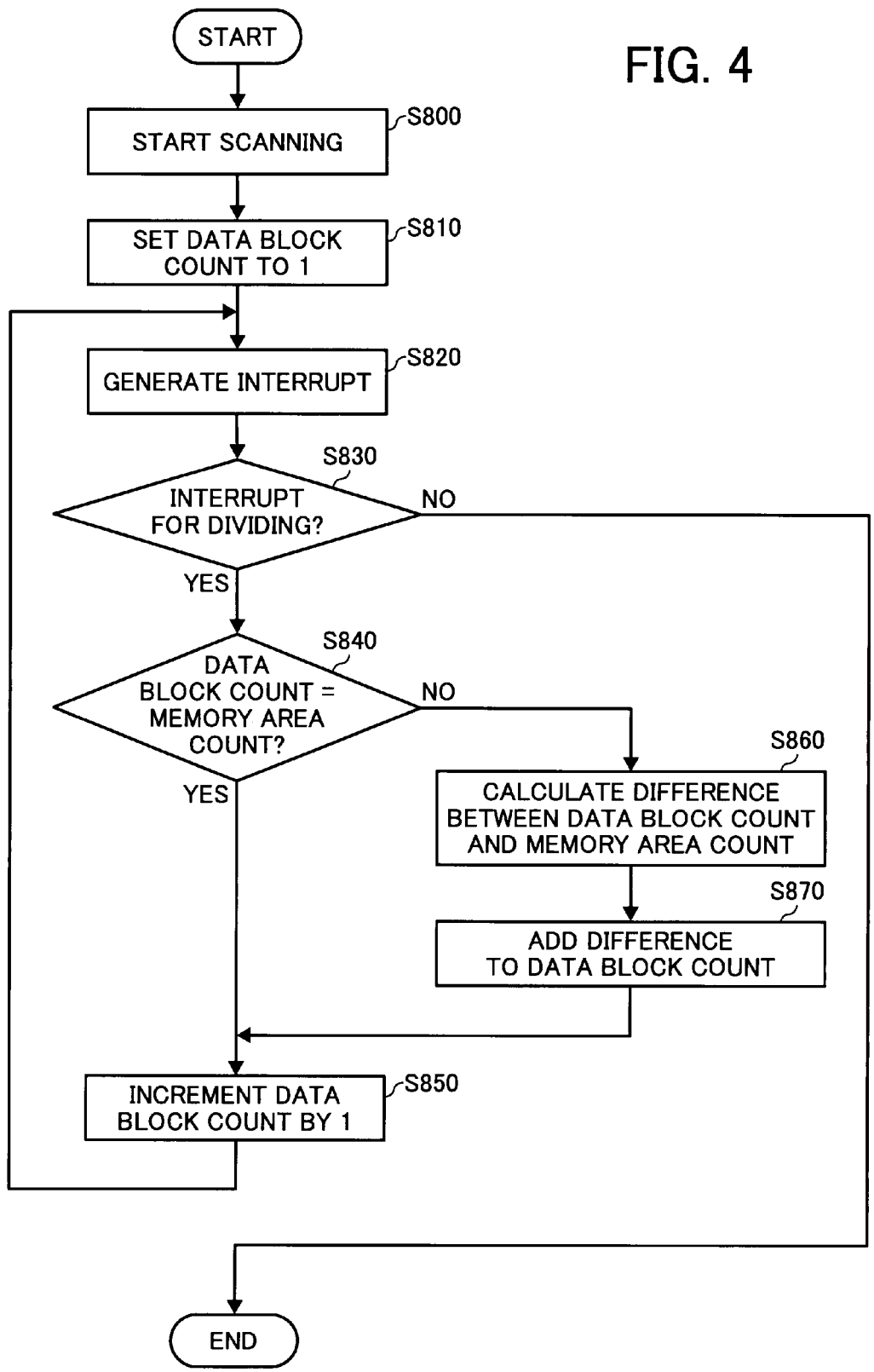
FIG. 4 is a flowchart illustrating an operation of the image processing apparatus of FIG. 1.

Referring now to FIG. 4, a flowchart illustrating an operation of the image processing apparatus 100 is described.

First, image scanning is started in step S800, and the data block count is set to 1 in step S810. When the scanning of a single band is completed, the interrupt generator 205 generates an interrupt in step S820. In step S830, it is determined whether the interrupt is for dividing the image data into data blocks or for indicating a termination of the image scanning.

When it is determined that the interrupt is a termination interrupt, the operation ends. When it is determined that the interrupt is for dividing the image data, the operation proceeds to step S840.

In step S840, the determination mechanism 203 compares the data block count and the memory area count. When the data block count and the memory area count are identical to each other, the operation proceeds to step S850. When the data block count and the memory area count are different from each other, the second allocator 204 calculates the number of memory areas to be additionally reserved by subtracting the data block count from the memory area count in step S860. The calculated number is then added to the data block count in step S870, and the operation proceeds to step S850.

In step S850, the data block count is incremented by one, after which the operation returns to step S820.

In the operation described above, when the data block count is 1 and the memory area count is 3 at step S860, the number of memory areas to be additionally reserved is calculated as 2. The data block count is incremented by the calculated number at step S870 so that the data block count and the memory area count are identical to each other.

Table 1 shows a relationship between the data block count and the memory area count for nine data blocks. The first column contains row numbers "1" through "9" each representing an actual number of data blocks encoded and stored before a particular time during the operation of FIG. 4, and the second and third columns represent the data block count and the memory area count at the particular time.

TABLE 1

Relationship between the data block count and the memory area count

| DATA BLOCK COUNT | MEMORY AREA COUNT |
|---|---|
| 1 | 1 |
| 2 | 2 |
| 3 | 3 |
| 4 | 4 |
| 5 | 8 |
| 9 | 9 |
| 10 | 10 |
| 11 | 11 |
| 12 | 12 |

In Table 1, the data block count and the memory area count are identical at rows "1" to "4" and rows "6" to "9", which indicates that, among the nine data blocks, each of the first to fourth data blocks and the sixth through ninth data blocks is stored within one memory area.

At the row "5", the memory area count and the data block count are different from each other, that is, the fifth data block is stored using more than one memory area. As there is a difference of 3 between the memory area count of 8 and the data block count of 5, the data block count is incremented by three and by one, respectively, i.e., by the number of difference and by the number of memory areas to be occupied by the next data block. Thereby, the data block count at the row "6" is 9, identical to the value of the memory area count.

In addition, the sequence of memory areas allocated by the first allocator 201 may preferably include two non-compression areas located at the end of the sequence with other memory areas set as the compression areas.

For example, when the original data size is 200 MB with the reference compression ratio set to 5 and the division number set to 8, an assumed size of the image data in a compressed form is 40 MB, the reference compressed size is 5 MB, and the uncompressed size is 25 MB. In such case, the first allocator 201 may allocate a memory space of 80 MB including six compression areas of 5 MB and two non-compression areas of 25 MB. The amount of memory consumed by the image data can be thereby reduced from 200 MB to 80 MB.

Figure 5A:
FIG. 5A is a schematic diagram showing an example of memory space allocated by the image processing apparatus of FIG. 1.

Referring now to FIG. 5A, a schematic diagram of a memory space 207 allocated by the first allocator 201 according to a first example embodiment of the present specification is described.

In FIG. 5A, the memory space 207 contains eight memory areas $r_1$ through $r_8$ in a sequence, reserved by the first allocator 201 for image data of eight data blocks. Among the memory area sequence, the first through sixth memory areas $r_1$ through $r_6$ are compression areas and the seventh and eighth memory areas $r_7$ and $r_8$ are non-compression areas.

Figure 5B:
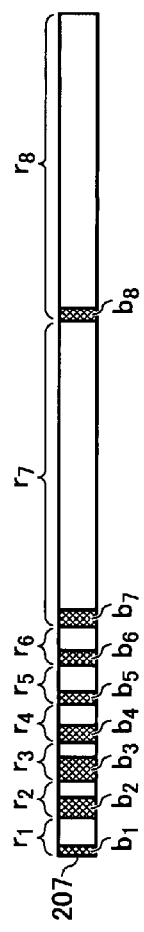
FIG. 5B is a schematic diagram showing the memory space of FIG. 5A containing image data.

Referring to FIG. 5B, a schematic diagram showing the memory space 207 containing data blocks is described.

In FIG. 5B, shaded portions represent eight data blocks $b_1$ through $b_8$. Each of the data blocks $b_1$ through $b_8$ is compressed by a compression ratio equal to or larger than the reference compression ratio, so as to be stored within a corresponding one of the compression or non-compression areas $r_1$ through $r_8$.

Figure 5C:
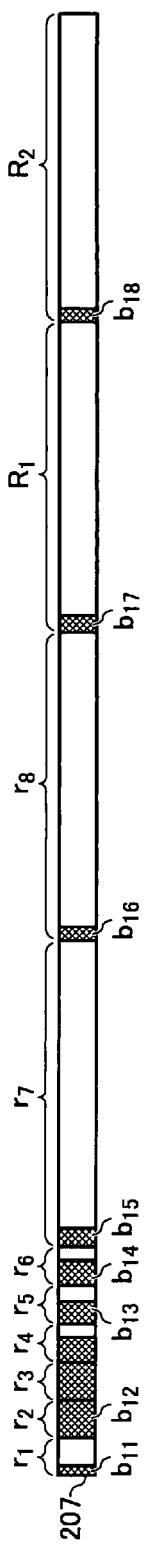
FIG. 5C is a schematic diagram showing the memory space of FIG. 5A with additional memory space containing image data.

Referring to FIG. 5C, a schematic diagram showing the memory space 207 with additional memory areas containing data blocks is described.

In FIG. 5C, shaded portions represent eight data blocks $b_{11}$ through $b_{18}$, and the memory space 207 includes two non-compression areas $R_1$ and $R_2$ in addition to the sequence of eight memory areas $r_1$ through $r_8$. The non-compression areas $R_1$ and $R_2$ are additional memory areas reserved by the second allocator 204. Among the eight data blocks $b_{11}$ through $b_{18}$, the second data block $b_{12}$ consumes two extra memory areas $r_3$ and $r_4$ in addition to the corresponding memory area $r_2$. The second allocator 204 dynamically allocates the additional memory areas $R_1$ and $R_2$ to store the seventh and eighth data blocks $b_{17}$ and $b_{18}$.

As shown in FIGS. 5A through 5C, when the division number is set to "n", i.e., image data is divided into n number of data blocks $b_1$ through $b_n$, the first allocator 201 reserves n number of memory areas $r_1$ through $r_n$ in a sequence for the data blocks $b_1$ through $b_n$. The memory area sequence includes n−2 number of compression areas as the first through (n−2)th memory areas $r_1$ through $r_{n-2}$ and two non-compression areas as the (n−2)th and n-th memory areas $r_{n-1}$ and $r_n$.

The compression areas $r_n$ through $r_{n-2}$ are assigned for data blocks $b_1$ through $b_{n-2}$, respectively, and the non-compression areas $r_{n-1}$ and $r_n$ are assigned for data blocks $b_{n-1}$ and $b_n$, respectively. In storing the image data, the data blocks $b_1$ through $b_n$ are sequentially disposed in the assigned memory areas $r_1$ through $r_n$.

When each data block is stored within each assigned memory area, no additional memory areas are needed to store the entire image data. When one of the data blocks occupies "N" number of extra memory areas, the second allocator 204 dynamically allocates N number of additional memory areas $R_1$ through $R_N$ to store the entire image data.

Figure 6A:
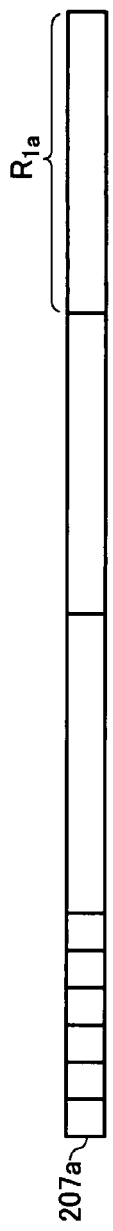
FIG. 6A is a schematic diagram illustrating allocation of additional memory space by the image processing apparatus of FIG. 1.
Figure 6B:
FIG. 6B is another schematic diagram illustrating the allocation of additional memory space by the image processing apparatus of FIG. 1.
Figure 6C:
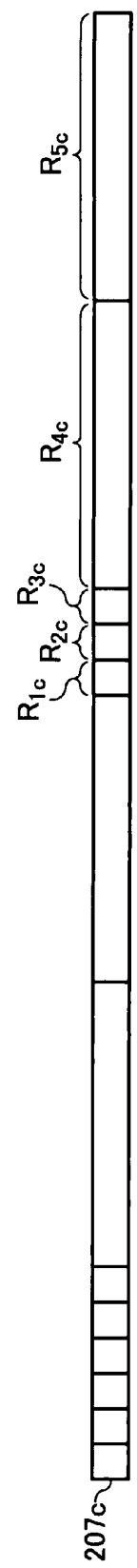
FIG. 6C is another schematic diagram illustrating the allocation of additional memory space by the image processing apparatus of FIG. 1.

Referring to FIGS. 6A through 6C, schematic diagrams of memory spaces 207a through 207c with additional memory areas dynamically allocated by the second allocator 204 are described.

With reference to FIG. 6A, the memory space 207a contains one additional memory area $R_{1a}$. The additional memory area $R_{1a}$ is a non-compression area.

With reference to FIG. 6B, the memory space 207b contains three additional memory areas $R_{1b}$ through $R_{3b}$. The first additional memory area $R_{1b}$ is a compression area and the second and third additional memory areas $R_{2b}$ and $R_{3b}$ are non-compression areas.

With reference to FIG. 6C, the memory space 207c contains five additional memory areas $R_1$ through $R_{5c}$. The first through third additional memory areas $R_{1c}$ through $R_{3c}$ are compression areas and the fourth and fifth additional memory areas $R_{4c}$ and $R_{5c}$ are non-compression areas.

As shown in FIGS. 6A through 6C, when the second allocator 204 dynamically allocates an additional memory space with N number of additional memory areas, the additional memory space includes N−2 number of compression areas as the first through (N−2)th additional memory areas $R_1$ through $R_{N-2}$ and two non-compression areas as the (N−1)th and N-th additional memory areas $R_{N-1}$ and $R_N$. Specifically, when N=1, one non-compression area $R_1$ is allocated, when N=2, two non-compression areas $R_1$ and $R_2$ are allocated, and when N≧3, N−2 number of compression areas $R_1$ through $R_{N-2}$ and two non-compression areas $R_{N-1}$ and $R_N$ are allocated.

Figure 7:
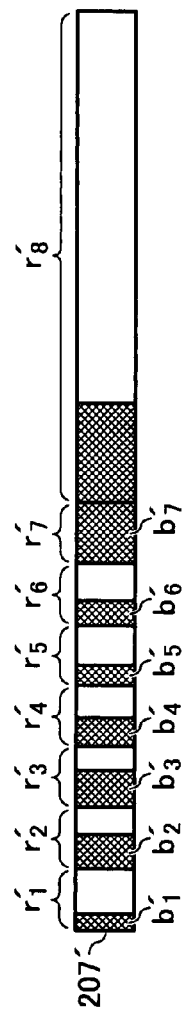
FIG. 7 is a schematic diagram showing an example of memory space containing image data.

Referring now to FIG. 7, a schematic diagram of a memory space 207' containing data blocks is described.

In FIG. 7, the memory space 207' contains eight memory areas, including seven compression areas $r'_1$ through $r'_7$ and one non-compression area $r'_8$. The memory areas $r'_1$ through $r'_8$ are reserved for image data divided into eight data blocks $b'_1$ through $b'_8$ associated therewith. Among the eight data blocks $b'_1$ through $b'_8$, the seventh data block $b'_7$ occupies an extra memory area $r'_8$ in addition to the corresponding memory area $r'_7$.

When it is determined that more than one memory area is used to store the seventh data block $b'_7$, there is not sufficient time to dynamically allocate additional memory space for the eighth data block $b'_8$, not shown, while the data transfer cannot be suspended to allow such additional allocation. As a result, the memory space 207' fails to store the eighth data block $b'_8$.

Such a storage failure can be avoided by retaining an amount of memory twice the uncompressed size until the second-to-last data block is stored, ensuring the storage of the last data block. Therefore, in the image processing apparatus 100, the first allocator 201 allocates two non-compression areas as the last and the second-to-last memory areas, and the second allocator 204 dynamically allocates two non-compression areas as the last and the second-to-last additional memory areas.

Figure 8:
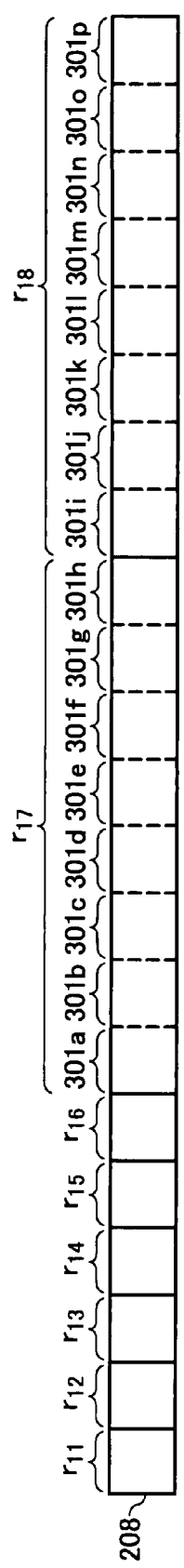
FIG. 8 is a schematic diagram showing another example of memory space allocated by the image processing apparatus of FIG. 1.

Referring now to FIG. 8, a schematic diagram of a memory space 208 allocated by the first allocator 201 according to a second example embodiment of the present specification is described.

The memory space 208 contains eight memory areas, including six compression areas $r_{11}$ through $r_{16}$ and two non-compression areas $r_{17}$ and $r_{18}$. The memory areas $r_{11}$ through $r_{18}$ are reserved by the first allocator 201 in a similar manner to the memory areas $r_1$ through $r_8$ of the memory space 207.

As indicated by dotted lines in FIG. 8, each of the non-compression areas $r_{17}$ and $r_{18}$ is divided into eight segments 301a through 301h, and 301i through 301p, respectively. The segments 301a through 301p respectively have the reference compressed size and can individually store different data blocks.

In the present embodiment, the first allocator 201 allocates N number of memory areas in a similar manner as the first example embodiment as depicted in FIG. 5A, except that the non-compression areas are divided into smaller segments. The size of one segment as well as the number of segments into which a non-compression area is divided may be arbitrarily determined according to the intended purpose. For example, the segment size may be set to twice the reference compressed size or to a fixed size of 1 MB.

Figure 9A:
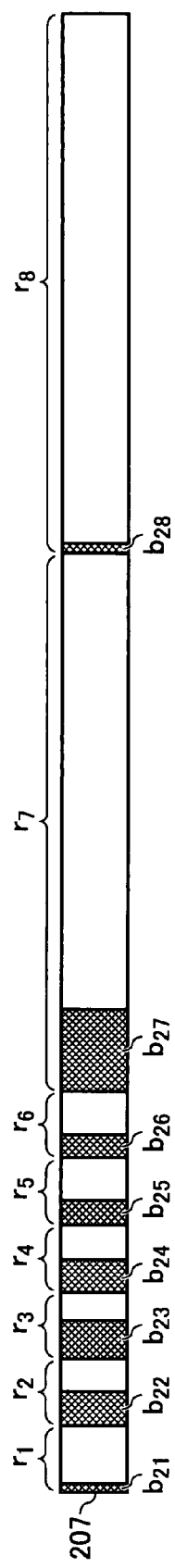
FIG. 9A is another schematic diagram showing the memory space of FIG. 5A containing image data.
Figure 9B:
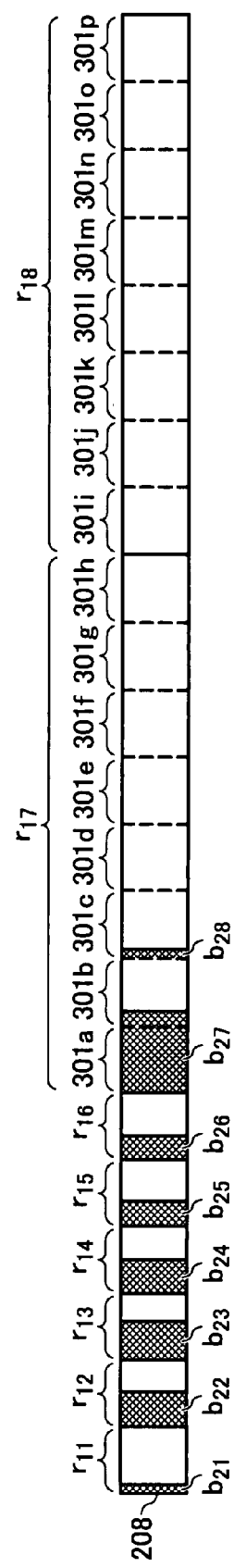
FIG. 9B is a schematic diagram showing the memory space of FIG. 8 containing image data.

Referring to FIGS. 9A and 9B, schematic diagrams showing the memory spaces 207 and 208 containing data blocks are described.

In each of FIGS. 9A and 9B, shaded portions represent first through eighth data blocks $b_{21}$ through $b_{28}$. The seventh data block $b_{27}$ is approximately one-seventh of the non-compressed size. The eighth data block $b_{28}$ is approximately one-sixtieth to one-seventieth of the non-compressed size.

As shown in FIG. 9A, each of the data blocks $b_{21}$ through $b_{28}$ are stored within a corresponding one of the memory areas $r_1$ through $r_8$, in a similar manner to the data blocks $b_1$ through $b_8$ of FIG. 5B. As a result, a substantial portion of each of the non-compression areas $r_7$ and $r_8$ remains empty and cannot be used for storing data, which causes an increase in the amount of wasted space.

As shown in FIG. 9B, each of the data blocks $b_{21}$ through $b_{26}$ are stored within a corresponding one of the compression areas $r_{11}$ through $r_{16}$. The data blocks $b_{27}$ and $b_{28}$ are stored within one non-compression area $r_{17}$, in which the seventh data block $b_{27}$ occupies two contiguous segments 301a and 301b, and the eighth data block $b_{28}$ occupies one segment 301c adjacent to the segment 301b. As a result, the segments 301d through 301h of the non-compression area $r_{17}$ as well as the segments 301i through 301p of the non-compression area $r_{18}$ remain unoccupied and can be used to store other data blocks, which leads to a saving of memory space and enhancement of data storage efficiency.

Additionally, in the second example embodiment, the second allocator 204 dynamically allocates memory in units of a size the same as the segment size (hereinafter referred to as "additional segment") so as to retain an amount of memory twice the uncompressed size until the second-to-last data block is stored, ensuring the storage of the last data block.

For example, when one of the data blocks occupies segments of the non-compression area in addition to the corresponding compression area, the second allocator 204 dynamically allocates additional segments equal in number to the occupied segments.

Further, when one of the data blocks occupies compression areas in addition to the corresponding compression area, the second allocator 204 dynamically allocates additional segments corresponding to the amount of additionally occupied memory areas.

In particular, when the segment size is set equal to the reference compressed size, the number of additional segments reserved by the second allocator 204 is the same as the number of segments or memory areas additionally occupied. In other cases, the second allocator 204 reserves a necessary and sufficient amount of additional memory so as to eliminate the amount of memory unused and wasted, thereby achieving a saving of memory space and enhancement of data storage efficiency.

This invention may be conveniently implemented using a conventional general purpose digital computer programmed according to the teachings of the present specification, as will be apparent to those skilled in the computer arts. Appropriate software coding can readily be prepared by skilled programmers based on the teachings of the present disclosure, as will be apparent to those skilled in the software arts. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image processing apparatus, comprising:
   an input device configured to receive image data of a given data size and transmit the image data in N data blocks, with N representing a first given number;
   an encoder configured to encode the N data blocks transmitted from the input unit;
   a memory configured to store the N data blocks encoded by the encoder;
   a first allocator configured to allocate, before encoding, N memory areas of at least one specified memory size within the memory;
   a data block size determination mechanism configured to determine whether each of the N data blocks is larger than the at least one memory size;
   a second allocator configured to dynamically allocate an additional memory area within the memory when the determination mechanism determines that one of the N data blocks is larger than the at least one memory size; and
   a processor configured to retrieve the image data from the memory for processing thereof,
   wherein the N data blocks are sequentially stored in the memory, the determination mechanism determines that one of the N data blocks is larger than the at least one memory size when a first count is different from a second count, and the second allocator calculates a difference between the first count and the second count to dynamically allocate M additional memory areas, the first count representing a number of data blocks stored in the memory and the second count representing a number of memory areas consumed by the stored data blocks, M representing a number corresponding to the calculated difference.

2. An image processing apparatus, comprising:
   an input device configured to receive image data of a given data size and transmit the image data in N data blocks, with N representing a first given number;

an encoder configured to encode the N data blocks transmitted from the input unit;
a memory configured to store the N data blocks encoded by the encoder;
a first allocator configured to allocate, before encoding, N memory areas of either a first memory size or a second memory size within the memory;
a data block size determination mechanism configured to determine whether each of the N data blocks is larger than at least one of the first and second memory sizes;
a second allocator configured to dynamically allocate an additional memory area within the memory when the determination mechanism determines that one of the N data blocks is larger than the at least one of the first and second memory sizes; and
a processor configured to retrieve the image data from the memory for processing thereof,
wherein at least one of a first and second memory size is specified based on a given compression ratio, the first given number N, and the given data size,
and wherein the first allocator is configured to allocate N−2 compression areas and two non-compression areas, with the N data blocks sequentially stored first in the N−2 compression areas and then in the two non-compression areas, the first memory size being an expected size of one data block compressed by the given compression ratio and the second memory size being an uncompressed size of one data block, the compression area being a memory area of the first memory size and the non-compression area being a memory area of the second memory size.

3. An image processing apparatus, comprising:
an input device configured to receive image data of a given data size and transmit the image data in N data blocks, with N representing a first given number;
an encoder configured to encode the N data blocks transmitted from the input unit;
a memory configured to store the N data blocks encoded by the encoder;
a first allocator configured to allocate, before encoding, N memory areas of at least one specified memory size within the memory;
a data block size determination mechanism configured to determine whether each of the N data blocks is larger than the at least one memory size;
a second allocator configured to dynamically allocate an additional memory area within the memory when the determination mechanism determines that one of the N data blocks is larger than the at least one memory size;
a processor configured to retrieve the image data from the memory for processing thereof; and
an interrupt generator configured to generate an interrupt indicating that each of the N data blocks is input to be stored, wherein the determination mechanism determines whether each of the N data blocks is larger than the at least one memory size in response to each interrupt.

4. The image processing apparatus according to claim 1, further comprising an interrupt generator configured to generate an interrupt indicating that each of the N data blocks is input to be stored, wherein the determination mechanism determines whether each of the N data blocks is larger than the at least one memory size in response to each interrupt.

5. The image processing apparatus according to claim 1, further comprising an interrupt generator configured to generate an interrupt indicating that each of the N data blocks is input to be stored, wherein the determination mechanism determines whether each of the N data blocks is larger than the at least one memory size after a given second number of data blocks are stored in the memory.

6. The image processing apparatus according to claim 2, wherein the second allocator assigns one non-compression area when dynamically allocating one additional memory area, and assigns two non-compression areas and M−2 compression areas when dynamically allocating M additional memory areas, with M representing a number equal to or larger than 2.

7. The image processing apparatus according to claim 2, wherein each of the non-compression areas is divided into a sequence of segments of a third size, each of the sequence of segments capable of serving as one memory area, and the N data blocks are sequentially stored first in the N−2 compression areas and then in the sequence of segments within the two non-compression areas.

8. The image processing apparatus according to claim 7, wherein the third size is determined to be equal to the first memory size.

9. An image processing method, comprising:
inputting image data of a given data size transmitted in N data blocks, with N representing a first given number;
encoding the N-data blocks;
allocating, before the encoding, N memory areas within a memory;
storing the encoded N data blocks in the memory;
determining whether each of the N data blocks is larger than a specified at least one memory size;
dynamically allocating an additional memory area within the memory when determining that one of the N data blocks is larger than the at least one memory size; and
retrieving the image data from the memory for processing thereof,
wherein the N data blocks are sequentially stored in the memory, one of the N data blocks is determined to be larger than the at least one memory size when a first count is different from a second count, and a difference between the first count and the second count is calculated to dynamically allocate M additional memory areas, the first count representing a number of data blocks stored in the memory and the second count representing a number of memory areas consumed by the stored data blocks, M representing a number corresponding to the calculated difference.

10. An image processing method, comprising:
inputting image data of a given data size transmitted in N data blocks, with N representing a first given number;
encoding the N-data blocks;
allocating, before the encoding, N memory areas within a memory;
storing the encoded N data blocks in the memory;
determining whether each of the N data blocks is larger than at least one of a first memory size and a second memory size;
dynamically allocating an additional memory area within the memory when determining that one of the N data blocks is larger than the at least one of a first and second memory size; and
retrieving the image data from the memory for processing thereof,
wherein at least one of the first memory size and a second memory size is based on a given compression ratio, the first given number N, and the given data size, and
wherein the step of allocating N memory areas further comprises allocating N−2 compression areas and two non-compression areas, with the N data blocks sequentially stored first in the N−2 compression areas and then in the two non-compression areas, the first memory size being an expected size of one data block compressed by the given compression ratio and the second memory size being an uncompressed size of one data block, the compression area being a memory area of the first memory size and the non-compression area being a memory area of the second memory size.

11. An image processing method, comprising:
inputting image data of a given data size transmitted in N data blocks, with N representing a first given number;
encoding the N-data blocks;
allocating, before the encoding, N memory areas within a memory;
storing the encoded N data blocks in the memory;
determining whether each of the N data blocks is larger than a specified at least one memory size;
dynamically allocating an additional memory area within the memory when determining that one of the N data blocks is larger than the at least one memory size;
retrieving the image data from the memory for processing thereof; and
generating an interrupt indicating that each of the N data blocks is input to be stored, wherein whether each of the N data blocks is larger than the at least one memory size is determined in response to each interrupt.

12. The method of claim 9, further comprising generating an interrupt indicating that each of the N data blocks is input to be stored, wherein whether each of the N data blocks is larger than the at least one memory size is determined in response to each interrupt.

13. The method of claim 9, further comprising generating an interrupt indicating that each of the N data blocks is input to be stored, wherein whether each of the N data blocks is larger than the at least one memory size is determined after a given second number of data blocks are stored in the memory.

14. The method of claim 10, wherein one non-compression area is assigned when dynamically allocating one additional memory area, and two non-compression areas and M−2 compression areas are assigned when dynamically allocating M additional memory areas, M representing a number equal to or larger than 2.

15. The method of claim 10, wherein each of the non-compression areas is divided into a sequence of segments of a third size, each of the sequence of segments capable of serving as one memory area, and the N data blocks are sequentially stored first in the N−2 compression areas and then in the sequence of segments within the two non-compression areas.

16. The method of claim 15, wherein the third size is determined to be equal to the first memory size.

17. A non-transitory computer readable medium storing a program for causing a computer to perform an image processing method, the image processing method comprising:
inputting image data of a given data size transmitted in N data blocks, with N representing a first given number;
encoding the N data blocks;
allocating, before the encoding, N memory areas within a memory;
storing the encoded N data blocks in the memory;
determining whether each of the N data blocks is larger than at least one specified memory size;
dynamically allocating an additional memory area within the memory when determining that one of the N data blocks is larger than the at least one memory size; and
retrieving the image data from the memory for processing thereof,
wherein the N data blocks are sequentially stored in the memory, one of the N data blocks is determined to be larger than the at least one memory size when a first count is different from a second count, and a difference between the first count and the second count is calculated to dynamically allocate M additional memory areas, the first count representing a number of data blocks stored in the memory and the second count representing a number of memory areas consumed by the stored data blocks, M representing a number corresponding to the calculated difference.

18. A non-transitory computer readable medium storing a program for causing a computer to perform an image processing method, the image processing method comprising:
inputting image data of a given data size transmitted in N data blocks, with N representing a first given number;
encoding the N-data blocks;
allocating, before the encoding, N memory areas within a memory;
storing the encoded N data blocks in the memory;
determining whether each of the N data blocks is larger than at least one of a first memory size and a second memory size;
dynamically allocating an additional memory area within the memory when determining that one of the N data blocks is larger than the at least one of a first memory size and a second memory size; and
retrieving the image data from the memory for processing thereof,
wherein at least one of the first memory size and a second memory size is based on a given compression ratio, the first given number N, and the given data size, and
wherein the step of allocating N memory areas further comprises allocating N−2 compression areas and two non-compression areas, with the N data blocks sequentially stored first in the N−2 compression areas and then in the two non-compression areas, the first memory size being an expected size of one data block compressed by the given compression ratio and the second memory size being an uncompressed size of one data block, the compression area being a memory area of the first memory size and the non-compression area being a memory area of the second memory size.

19. A non-transitory computer readable medium storing a program for causing a computer to perform an image processing method, the image processing method comprising:
inputting image data of a given data size transmitted in N data blocks, with N representing a first given number;
encoding the N data blocks;
allocating, before the encoding, N memory areas within a memory;
storing the encoded N data blocks in the memory;
determining whether each of the N data blocks is larger than a specified at least one memory size;
dynamically allocating an additional memory area within the memory when determining that one of the N data blocks is larger than the at least one memory size;
retrieving the image data from the memory for processing thereof; and
generating an interrupt indicating that each of the N data blocks is input to be stored, wherein whether each of the N data blocks is larger than the at least one memory size is determined in response to each interrupt.

* * * * *